(12) United States Patent
Dillow et al.

(10) Patent No.: US 7,140,025 B1
(45) Date of Patent: Nov. 21, 2006

(54) METHOD AND APPARATUS FOR PROVIDING A REAL-TIME MESSAGE ROUTING COMMUNICATIONS MANAGER

(75) Inventors: Carolyn J. Dillow, Colorado Springs, CO (US); Roger N. Tucker, Colorado Springs, CO (US)

(73) Assignee: MCI, LLC, Basking Ridge, NJ (US)

( * ) Notice: Subject to any disclaimer, the term of this patent is extended or adjusted under 35 U.S.C. 154(b) by 0 days.

(21) Appl. No.: 09/442,199

(22) Filed: Nov. 16, 1999

(51) Int. Cl.
*G06F 9/46* (2006.01)
(52) U.S. Cl. ............ 719/313; 379/221.02; 379/221.08; 379/221.09
(58) Field of Classification Search ........ 379/219–332, 379/15.02–15.04; 709/100–108, 200–250; 718/106; 719/311–314
See application file for complete search history.

(56) References Cited

U.S. PATENT DOCUMENTS

| | | | | |
|---|---|---|---|---|
| 5,537,461 A | * | 7/1996 | Bridges et al. ............... | 379/88 |
| 5,768,360 A | * | 6/1998 | Reynolds et al. ........... | 379/220 |
| 6,003,084 A | * | 12/1999 | Green et al. ................ | 709/227 |
| 6,157,941 A | * | 12/2000 | Verkler et al. .............. | 709/202 |
| 6,175,879 B1 | * | 1/2001 | Shah et al. .................. | 709/330 |
| 6,363,411 B1 | * | 3/2002 | Dugan et al. ............... | 709/202 |
| 6,411,700 B1 | * | 6/2002 | Rojas ..................... | 379/220.01 |
| 6,470,453 B1 | * | 10/2002 | Vilhuber ..................... | 713/201 |
| 6,608,814 B1 | * | 8/2003 | Libman et al. ............. | 370/230 |

* cited by examiner

*Primary Examiner*—William Thomson
*Assistant Examiner*—Charles Anya

(57) ABSTRACT

A communications manager in a telecommunications transaction server communicates service request messages and service response messages between one or more remotely executing service request processes and one or more service applications executing on the transaction server. A main thread in the communications manager monitors connections requests and initializes other threads. A unique logical communications connection is established between one of the service request processes and the communications manager. The communications manager creates both a read thread and a write thread for each logical communication connection that is validated and active. The read thread communicates service request messages from a service request process to an appropriate service application. The write thread communications service response messages from the service application to the service request process that issues the service request message. A monitor thread collects service response messages from a queue and directs them to the appropriate write threads via an in-memory write queue.

25 Claims, 4 Drawing Sheets

US 7,140,025 B1

METHOD AND APPARATUS FOR PROVIDING A REAL-TIME MESSAGE ROUTING COMMUNICATIONS MANAGER

BACKGROUND OF THE INVENTION

1. Field of the Invention

This invention relates in general to communications systems, and more particularly to providing a real-time message routing communications manager in a communications system.

2. Description of Related Art

Modern telecommunications network carriers ("carriers") typically provide a broad range of telecommunications services, such as 1-800 services, Virtual Private Network (VPN) services, and Calling Card (CC) services. Computing platforms, generally called Service Control Points (SCPs), are used for real-time processing of such services.

For example, a customer may contract with a carrier to provide a 1-800 service with intelligent call routing. When the 1-800 number is dialed by a caller, a 1-800 service request is sent across a telecommunications network to an SCP. A 1-800 service application executing at the SCP receives the service request and determines the proper call center to which the call should be routed, in accordance with routing parameters provided by the customer (e.g., time of day, call center volume, geographical origin of the call). A service response indicating the proper routing of the call is then returned through the telecommunications network to connect the 1-800 call with the proper call center. It is desirable that the service processing be transparent to the caller, maintaining real-time performance to connect the call.

Typically, an SCP is coupled to a telecommunications network via a telecommunications switch and includes one or more client server communications managers (CSCM) and one or more transaction servers. A CSCM interfaces between the switch and the transaction server, providing functions such as protocol conversion and allocation of service requests among multiple transactions servers (e.g. load balancing). A transaction server executes the service applications that provide services to the telecommunication network. Service requests, such as a 1-800 service request, are received through the switch by one of the CSCMs and sent to one of the transaction servers for processing by a service application. Optimizing the communication of messages (e.g., service requests and responses) among the CSCMs and the transaction servers is an important factor in maintaining real-time performance.

Traditionally, proprietary communication systems and communication methods have been employed to communicate among communications managers and transaction managers. However, open computer systems have gained popularity largely because customers wanted choices among multiple computer vendors to solve their computing needs. The growing use of distributed systems has given rise to a need to develop applications capable of running in an open environment while executing on a variety of different computing systems. Accordingly, proprietary communications methods are being replaced by solutions supporting open, published, and widely-available communications standards, such as TCP/IP (Transmission Control Protocol/Internet Protocol), which is not specifically designed to provide real-time communications. For example, although the TCP protocol guarantees message delivery, there is no inherent mechanism for guaranteeing that a read or write on a single connection does not impact (i.e., decrease) the communications performance of other communications on that connection or on other connections. As such, a specialized communications application is needed to maintain real-time performance of calls involving telecommunication services in an open system environment.

SUMMARY OF THE INVENTION

A communications manager for communicating between a remote service request process and one or more service applications providing communications services in a communications network is provided. A logical communications connection is established between the service request process and the communications manager. A read thread is associated with the logical communications connection for receiving a request message communicated by the service request process. The read thread also forwards the request message to one of the service applications. A write thread is associated with the logical communications connection for receiving a response message generated by the service application. The write thread also forwards the response message to the service request process.

A method and program products for communicating between a remote service request process and one or more service applications providing communications services are also provided. A logical communications connection is established between the service request process and a communication manager. A read thread is created in association with the logical communications connection. The read thread receives a request message communicated by the service request process. The read thread communicates the request message to one of the service applications. A write thread is created association with the logical communications connection. The write thread receives a response message generated by the service application. The response message is communicated through the write thread to the service request process.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

An embodiment of the present invention provides a non-blocking communications manager that routes service requests and service responses among multiple remote clients (e.g., service request processes) and multiple server-resident service applications. To maintain substantially real-time performance, the communications manager preferably services all clients and service applications with an equal priority, preventing a first network connection from degrading the performance of a second network connection, and further, performing a remote client connection's read and write independently so that the connection's read operation does not block the connection's write operation and vice versa.

Figure 1:
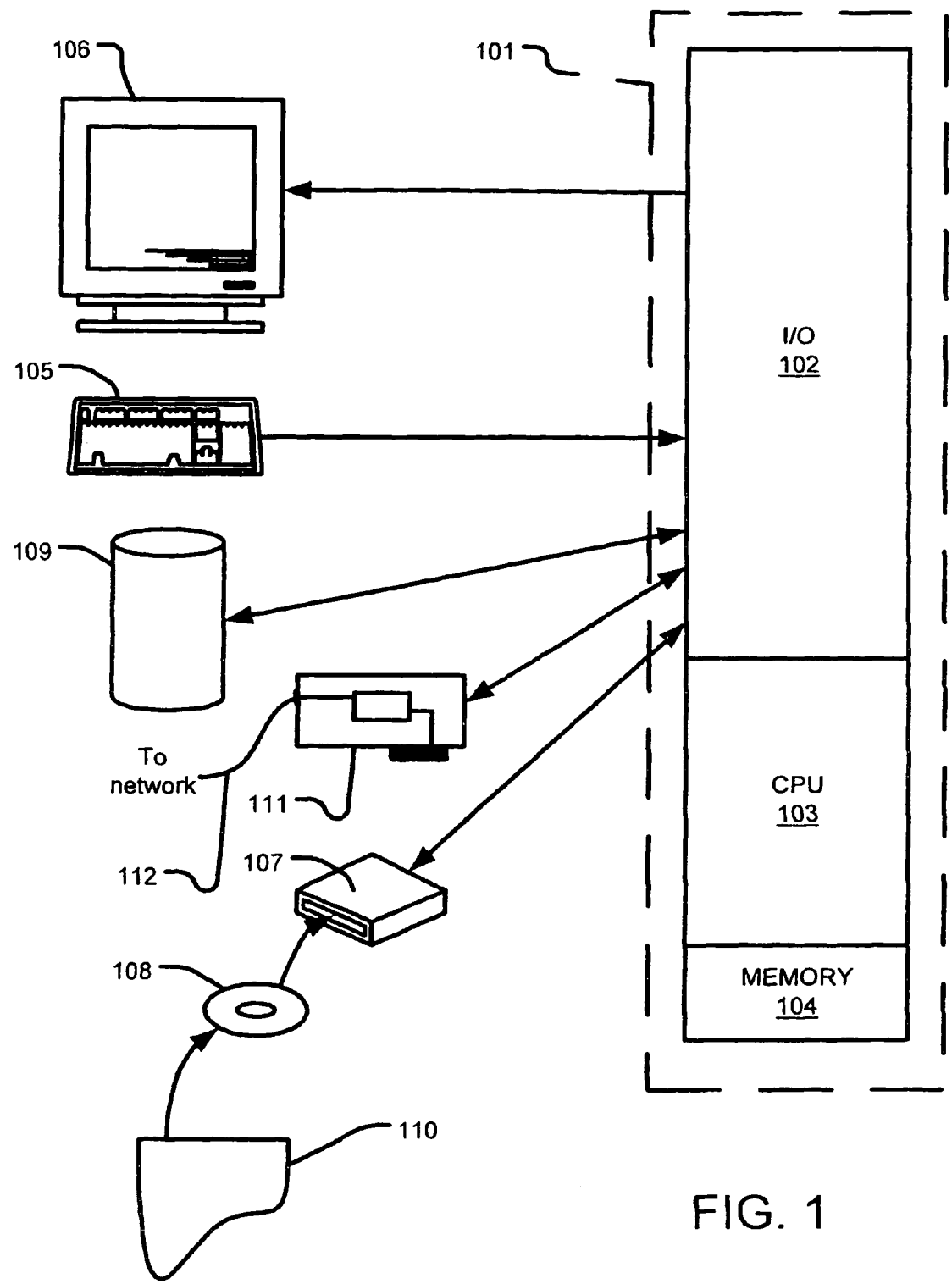
FIG. 1 depicts a general purpose computer that implements the logical operations of an embodiment of the present invention.

FIG. 1 depicts a general purpose computer capable of executing a program product embodiment of the present invention. One operating environment in which the present invention is potentially useful encompasses the general purpose computer. In such a system, data and program files may be input to the computer, which reads the files and executes the programs therein. Some of the elements of a general purpose computer are shown in FIG. 1 wherein a processor 101 is shown having an input/output (I/O) section 102, a Central Processing Unit (CPU) 103, and a memory section 104. The present invention is optionally implemented in software devices loaded in memory 104 and/or stored on a configured CD-ROM 108 or storage unit 109 thereby transforming the computer system in FIG. 1 to a special purpose machine for implementing the present invention.

The I/O section 102 is connected to keyboard 105, display unit 106, disk storage unit 109, and disk drive unit 107. Generally, in contemporary systems, the disk drive unit 107 is a CD-ROM driver unit capable of reading the CD-ROM medium 108, which typically contains programs 110 and data. Computer program products containing mechanisms to effectuate the systems and methods in accordance with the present invention may reside in the memory section 104, on a disk storage unit 109, or on the CD-ROM medium 108 of such a system. Alternatively, disk drive unit 107 may be replaced or supplemented by a floppy drive unit, a tape drive unit, or other storage medium drive unit. The network adapter 111 is capable of connecting the computer system to a network via the network link 112. Examples of such systems include SPARC systems offered by Sun Microsystems, Inc., personal computers offered by IBM Corporation and by other manufacturers of IBM-compatible personal computers, and other systems running a UNIX-based or other operating system. In accordance with the present invention, software instructions such as those directed toward communicating between a client and a server; coordinating communications among threads, service applications, monitors, and administrative processes; providing services; and accessing data may be executed by CPU 103, and data such as service requests and responses, connection information, and payloads may be stored in memory section 104, or on disk storage unit 109, disk drive unit 107 or other storage medium units coupled to the system.

Figure 2:
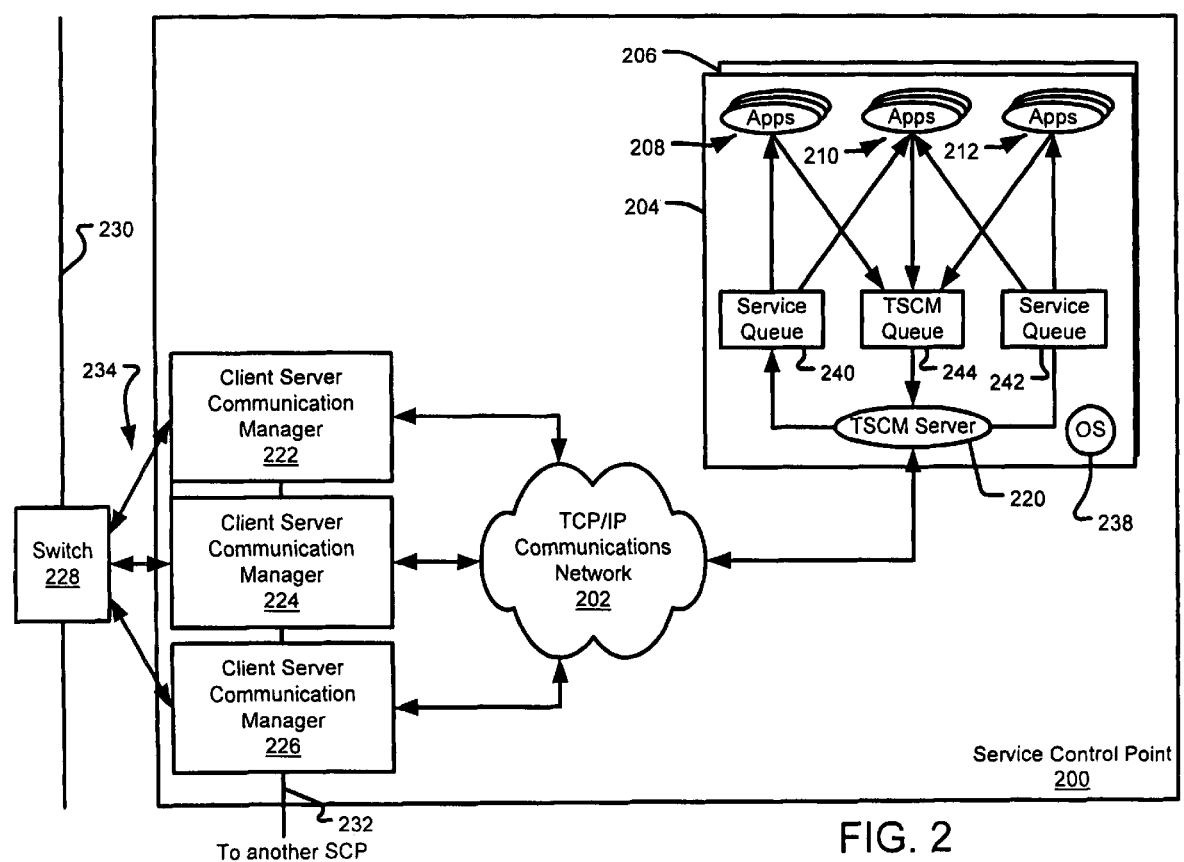
FIG. 2 illustrates a service control point including a transaction server communications manager (TSCM) Server in an embodiment of the present invention.

FIG. 2 illustrates a service control point 200 including a transaction server communications manager (TSCM) server 220 in an exemplary embodiment of the present invention. When a call requiring a service, such as a 1-800 service, is initiated by a caller, a service request message is received by the central office via a local telephone network. A system at the central office determines, by searching a database, which long distance carrier is to service the 1-800 call. The systems of the central office then route the service request message via a public switched network 230 to switch 228, which typically belongs to the long distance carrier. The request message is then forwarded on a service network, such as shown by 234, from the switch 228 to SCP 200 for processing of the requested service.

A 1-800 service application executes at the SCP 200 to determine the destination, routing, and billing terms for the 1-800 call and then responds to the switch 228 indicating that the call can be connected with the receiving telephone. Accordingly, one or more service request messages and service response messages are preferably communicated between the SCP 200 and the switch 228 when providing a communications service for a call. In addition, an SCP may communicate service messages with other SCPs through a communications link 232. A plurality of switches (not shown) may also be coupled to the SCP 200 to provide communications for call services.

A data link 234 connects the switch 228 to redundant CSCMs 222, 224, and 226 at the SCP 200. On the back end, each communication manager interfaces with a number of transaction servers 204 and 206, coupled by a TCP/IP communications network 202 including, for example, an FDDI (Fiber Distributed Data Interface) ring. A CSCM, such as CSCM 222, receives a service request message from the switch, processes the communications protocol of the service request message, and forwards the service request message to a selected transaction server, such as transaction server 204. A CSCM is generally a general purpose computer executing a service request process and other specialized software to provide functions such as protocol conversion, allocation of service request messages to selected transaction servers, and receipt of service response messages. Special purpose computers may also be designed to perform the functions of a CSCM.

A transaction server is generally a general purpose computer that executes specialized service applications for providing call services to a communications network. The TSCM server 220 executes on the transaction server 204 and coordinates the communications of service request messages and service response messages to and from available service applications, including applications 208, 210, and 212. A service application 208, for example, preferably executes on the transaction server 204, processing service request messages and generating service response messages, which the CSCM 222 sends back through the switch 228.

Service applications are software programs that execute on a transaction server to process request messages for a particular service. Typically, the transaction server 204 supports more than one service and, therefore, typically executes multiple specific service applications. In a preferred embodiment, there are multiple redundant transaction servers for each service type at a single SCP 200 site. In addition, there are preferably multiple, geographically distributed SCPs redundantly supporting services for a communications network.

Each service application 208 and 212 receives service request messages from a single service queue relating to a single service type. However, service applications 210 provide services for more than one service type and, hence, are capable of retrieving service request messages from both of service queues 240 and 242, which service different service types. Services applications 210 also return service response messages to the TSCM queue 244. It should be understood that a single TSCM queue 244 is employed in this embodiment of the present invention, although multiple TSCM queues can be employed within the scope of the present invention.

Both the service request processes (i.e., executing on CSCM 222, 224 and 226) and the service applications 208, 210 and 212 support a defined interface through the TSCM server 220. Preferably, each service request process can generate a service request message for any service supported by an available transaction server.

The transaction server 204 includes an operating system (OS) 238, such as UNIX, to provide the necessary computing functions to interact with the server resources, to provide networking I/O operations via TCP/IP, and to provide intra-server process communications needed to support these services (e.g., multiple reader queues). The use of alternative networking protocols are also contemplated within the scope of the present invention. The OS 238 is responsible for providing a multi-tasking processing environment to execute each of the service applications 208, 210, and 212, the TSCM server 220, and other processes concurrently in the transaction server 204. Furthermore, within at least the TSCM server 220, multiple processing threads are capable of executing concurrently by virtue of the multi-tasking capability of the OS 238. The OS 238 performs the process scheduling and thread context switching operations that occur as part of the multi-tasking environment.

In an exemplary embodiment of the present invention, processing modules within SCP 204 include the TSCM Server 220 and the service applications 208, 210, and 212. Each service application registers with the TSCM server 220 as part of its initialization procedure. Preferably, the registration process determines the service type, and therefore, the service queue, that the service application supports. The TSCM server can also cause new service applications to be initiated, if necessary, particularly in response to a service request for a previously uninitiated service type.

A service application preferably de-registers with the TSCM server 220 as part of its termination procedure. If a service application terminates without de-registering, the TSCM server 220 employs alternative mechanisms for maintaining the service status and detecting inactive services.

Service applications receive service request messages by way of multiple reader service queues, such as 240 and 242. As the TSCM server 220 receives service request messages, the messages are validated and forwarded to the appropriate service queue, preferably in accordance with service type (e.g., 1-800 service, VPN service, and CC service). An exemplary service queue is a first-in, first-out linked list, array, or other data structure for ordering the receipt of messages. A service application that is appropriately registered with the TSCM server 220 can retrieve a service request message deposited on one or more of the service queues. Furthermore, the multiple reader aspect of the service queues allows multiple service applications to be registered for the same service type.

Service applications 208, 210, and 212 respond to service request messages sent by the communication managers by depositing corresponding service response messages on the TSCM queue 244. The TSCM server 220 reads the service response messages received on the TSCM queue 244 and forwards the service response messages on to the appropriate CSCM.

Figure 3:
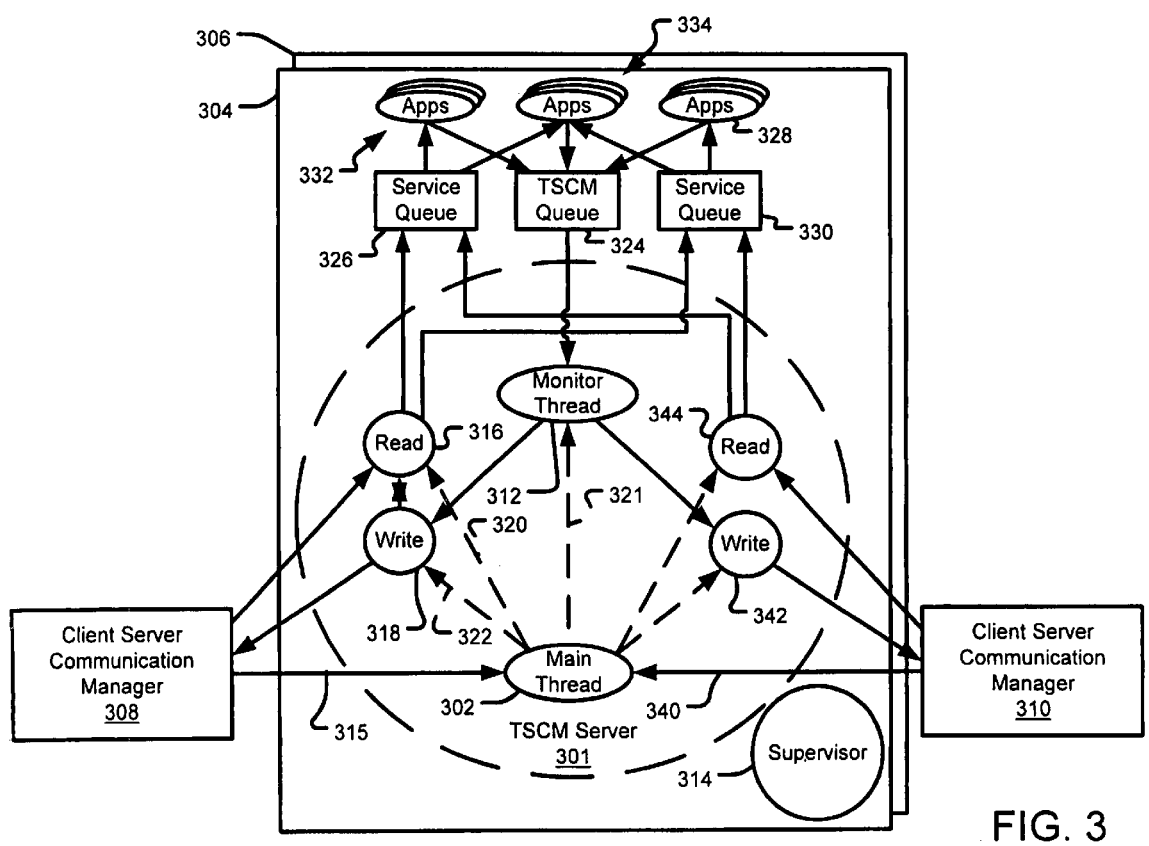
FIG. 3 illustrates process threads of a TSCM server in an embodiment of the present invention.

Characteristics provided by an exemplary TSCM server 220 preferably includes one or more of the following:
1. Support for multiple connections to service request processes (e.g., CSCMs)
2. Support for registration/deregistration of multiple service applications in accordance with service type
3. Detection of a inactive service application, even though the service application did not properly deregister
4. Isolation of a disruption or termination on a single logical communication connection from the service applications and from other active logical communication connections
5. Maintenance of logical communication connections such that the write operation to a single link does not block a read operation from a single link.
6. A graphical monitor accessible from a single central location that displays one or more of the following:
   6.1. number of active CSCMs connected;
   6.2. number of service applications registered;
   6.3. volume of messages processed per service type; and
   6.4. status of CSCM connections.
7. A query from the connected CSCM to the TSCM server_regarding the status of service and resulting in a response from the TSCM server to the CSCM indicating all active services that are registered with the TSCM server
8. An unsolicited service available notification to connected CSCMs when a new service application registers or deregisters with the TSCM server
9. Servicing of each logical communication connection at the same priority, independently of other logical communications connections
10. Routing of a service request message to the appropriate service application
11. Routing of a service response message from a service application to the originating CSCM
12. A standard, callable set of API services to the service applications that allow a process to perform the following functions:
    12.1. Register with the TSCM server
    12.2. De-Register with the TSCM server
    12.3. Receive a service request message
    12.4. Send a service response message FIG. 3 illustrates exemplary process threads of a TSCM server 301 in an embodiment of the present invention. A thread includes a computer process that can execute concurrently with and independently of other processes in the computer. A thread is an encapsulation of the flow of control in a program. Multithreaded programs may have several threads running through different code paths concurrently. In a typical process in which multiple threads exist, zero or more threads may actually be running at any one time. The actual number of threads running at any one time depends on the number of CPUs the computer on which the process is running, and also on how the threading system is implemented. A machine with N CPUs can run no more than N threads in parallel, but the machine may give the appearance of running many more than N in parallel, by sharing the CPU(s) among threads. In other words, zero or more of the process threads in an embodiment of the present invention may actually be running simultaneously, depending on the number of processors in the transaction server 304 and the availability of other resources, or may merely appear to be running the threads simultaneously, swapping CPU usage with other threads. Both modes of operation are preferably encompassed by the concept of "concurrent execution".

The TSCM server 301 is part of a transaction server 304 at an exemplary SCP site that also includes another transaction server 306 and CSCMs 308 and 310. A main thread 302 executes in the TSCM server 301 to monitor a communications port (e.g., a socket) on the transaction server 304 for TCP/IP client connections (i.e., exemplary logical communication connections), to validate logical communications connections, to assist in service application initialization, and to create read, write, and monitor threads. The main thread 302 generally creates or initiates processes within the transaction server 304 (although service applications may also be initiated by a supervisor process 314). For example, when the main thread 302 is initialized in the transaction server 304, the main thread 302 creates or initializes the monitor thread 312. In FIG. 3, the creation/initialization operation for the monitor thread 312 is indicated by dotted line 321. Preferably, a single monitor thread 312 receives registration/deregistration messages and service response messages from the service applications, although multiple monitor threads may be employed within the scope of the present invention.

Furthermore, the main thread 302 monitors network ports for client connection requests by means of a "blocking accept" operation, which specifies the kind of request for which the main thread 302 is monitoring and relinquishes a CPU (central processing unit) of the transaction server's until that type of request is received. When a client connect request 315 for a logical communications connection from the CSCM 308 is detected, the operating system or a network subsystem in the transaction server 304 "wakes up" the main thread 302 to process the connection request. In this manner, the main thread 302 does not monopolize a CPU of the transaction server 304 and allows other threads and processes to operate concurrently.

The main thread 302 accepts the connection request 315 and validates the IP (internet protocol) address of the requesting logical communication connection (e.g., from the communication manager 308) against a list of valid client IP addresses read from a configuration datastore (e.g., a configuration file). If the validation fails, the main thread 302 closes the logical communications connection. If the validation is successful, the main thread 302 records information about the connecting CSCM, including an identifier of the socket dedicated to the logical communications connection, and creates or initiates a read thread 316 and a write thread 318 associated with the logical communications connection. In FIG. 3, the creation/initialization operations for the read thread 316 and the write thread 318 are indicated by dotted lines 320 and 322, respectively. After creating the read and write threads associated with the connection 315, the main thread 302 posts a "blocking accept" to wait for another client connection request.

In an exemplary embodiment of the present invention, the TSCM server 301 allows only one connection from a single IP address. Although it is desired to allow multiple logical communication connections from a single IP address by requiring the service request process to also bind to a TCP port, TCP prevents a client from reusing given TCP port after a loss of connection for a period of time defined to be twice the maximum segment lifetime (MSL). Internet RFC 793 specifies the MSL as 2 minutes; however, varying implementations specify an MSL as 30 seconds, 1 minute, or 2 minutes. Regardless, the delay introduced by these values does not allow a CSCM to reconnect to the TSCM server 301 immediately upon a loss of connection. In order to avoid this reconnect delay, the CSCM is allowed to connect on any TCP port. As a result, the TSCM server 301 can only validate a client to the IP address level and, therefore, currently only supports one client connection from a single IP address. In an alternative embodiment of the present invention, however, the limitation introduced by TCP/IP may be avoided by using an different networking protocol and multiple connections per network address or logical address may be employed, as contemplated within the scope of the present invention.

Because TCP/IP is a byte-stream protocol, a message sent across the network in one embodiment of the present invention contains appropriate header information that allows the receiving application to determine message boundaries. In alternative embodiments, different structures for communication messages may be employed within the scope of the present invention. As such, a message exchange between the TSCM server 301 and a CSCM 308 preferably contains the following header on each message:

struct tcp_hdr
    {
    unsigned short msg_size;
    unsigned char message_type;
    };

In an embodiment of the present invention, a CSCM communicating with the TSCM server 301 supports at least the following messages as defined below:

Service Request Message: A request message sent by CSCM to request a service from a service application.
    Message type=DATA_TRANSMIT_MESSAGE (0xFF):
    struct cscm_to$_{13}$ tscm_struct
    {
    struct tcp_hdr hdr;
    unsigned char cs_number;
    unsigned int process_id;
    unsigned char trigger_id;
    unsigned char data[1100];
    };

Status Request Message: A request message sent by a CSCM to request status of a service executing on the transaction server.
    Message type=STATUS_REQUEST_MESSAGE (0xFE):
    struct cscm_request_status_struct
    {
    struct tcp_hdr hdr;
    unsigned char cs_number;
    };

Service Update Message: An unsolicited service update message sent by the TSCM server to one or more CSCMs.
    Message type=SERVICE_INIT_MESSAGE (0xFC) or SERVICE_TERM_MESSAGE (0xFB):
    struct tscm_service_struct
    {
    struct tcp_hdr hdr;
    unsigned char service_id;
    unsigned int process_id;
    };

Service Response Message: A response message sent to a CSCM by the TSCM server on behalf of the service applications in response to a service request message.
    Message_type=DATA_TRANSMIT_MESSAGE (0xFF):
    struct tscm_to_cscm_struct
    {
    struct tcp_hdr hdr;
    unsigned char data[110];
    };

Status Response Message: A response message sent to a CSCM by the TSCM server in response to a status request message.
    Message type=STATUS_RESP_MESSAGE (0xFD):
    struct tscm_status_response_struct
    {
    struct tcp_hdr hdr;

```
unsigned char num_services;
struct service_status_struct
    {
    unsigned char service_id;
    unsigned int process_id;
    }service_status[255];
};
```

FIG. 3 also illustrates another client connection 340 and associated threads 342 and 344, for example, corresponding to CSCM 310. For each new client connection that passes validation, a new read thread and write thread are created by the TSCM server. Network I/O (input/output) between the communications manager 310 and one or more service applications, specifically service request messages and service response messages, is communicated through the read and write threads corresponding to a given logical communications connection.

The TSCM server 301 defines a set of API (application program interface) services to be used by co-resident service application for inner-platform communication with the TSCM server 301. When a service application is initialized, the service application registers with the TSCM server 301. If the service type that the service application (such as service application 328) offers is new, the TSCM server creates a new service queue (such as service queue 330) dedicated to the new service type. If the selections of service types offered on the platform are modified as a result of new service types becoming available (i.e., typically resulting in a new service queue being created) or existing service types being deactivated, the monitor thread 312 broadcasts the service state change to all connected CSCMs using a service update message through the write threads corresponding to each logical communications connection.

The read thread 316 is responsible for receiving service request messages from the CSCM 308 in association with the logical communications connection that was validated by the main thread 302. Once created, the read thread 316 posts a "blocking read" on the logical communications connection (e.g., corresponding to the unique socket) with the CSCM 308. When the CSCM 308 writes a service request message over the logical communications connection, the read thread 316 receives the request and validates the service request message structure. The read thread 316 then ensures that the requested service type is active on the transaction server 304 by accessing a service status memory block (i.e., the SStatus memory block 416 in FIG. 4) and the process status memory block (i.e., the PStatus memory block 412 in FIG. 4).

After the service request message is validated and the requested service type is verified, the read thread 316 deposits the service request message on the appropriate service queue 326, in accordance with the requested service type, for processing by one of the service applications 332 or 334. If no service application is available to process the service request, the read thread 316 obtains a buffer from the free buffer memory pool (i.e., the free buffer pool 418 of FIG. 4) and writes a service update status message to a write queue (i.e., the WQueue 420 of FIG. 4) for retrieval by the write thread 318, which then forwards the service update status message to the CSCM 308. If the read thread 316 cannot write the service request message to the service queue 326 (e.g., because the service queue 326 is full), an error message or alarm is generated, a counter in the service status memory block is incremented, the service request message is aborted, and the read thread 316 resumes monitoring its logical communications connection to avoid impacting the communication performance of a subsequent service request The monitor thread 312 monitors the TSCM queue 324 using a "blocking read", which requests a read operation of a specified type of message (e.g., preferably a service or status response message or service update message in the case of the monitor thread) and then, if no such messages are available in the TSCM queue 324, the monitor thread 312 relinquishes the CPU to another process. When a message of the specified type is received in the TSCM queue 324, the operating system or other scheduling process "wakes up" the monitor thread 312, which retrieves the message from the TSCM queue 324 and continues processing the message. During this processing, the monitor thread 312 validates the response message, verifies that the logical communications connection associated with the appropriate write thread 318 is still active, retrieves the response message from the TSCM queue, deposits the response message in the in-memory write queue (i.e., WQueue 420 in FIG. 4), and signals the write thread 318 that a message is available in the write queue (using a condition signal).

In addition to receiving service response messages, the monitor thread 312 also receives service update messages from the co-resident service applications executing on the transaction server 304. When a service update message (e.g., a registration or deregistration message) is retrieved from the TSCM queue 324, the monitor thread 312 modifies the service status memory block (i.e., the SStatus block 416 of FIG. 4) to reflect a change in active services. If the service update message indicates that a new service type is added, the monitor thread creates a new service queue for the new service type and service application. Likewise, if an existing service type is deleted, then the monitor thread 312 deallocates or otherwise deactivates the corresponding service queue. The monitor thread 312 also generates a service update message for all connected CSCMs and deposits the message in the write queue. The write thread 318 then retrieves the message and performs the appropriate network write to the connected CSCMs.

In an embodiment of the present invention, all service response messages are managed by the single TSCM queue 324 and monitor thread 312. It is preferable to optimize the communication of monitor thread 312 and the corresponding write threads so that individual service response messages are processed quickly to avoid substantially impacting the communication of a subsequent service response message. Accordingly, in this embodiment, communications between the monitor thread 312 and a write thread 318 are performed by means of memory operations (see in-memory write queue 420 in FIG. 4). In an alternative embodiment, multiple monitor threads may be used and/or high-performance inter-process communications may be used within the scope of the present invention.

The write thread 318 is responsible for retrieving service response messages (and service update messages) from the in-memory write queue in association with the logical communications connection that was validated by the main thread 302. After initialization, the write thread 318 is initialized, it posts a "blocking wait" for any data buffers (e.g., service response messages, service update status messages, etc.) added to its dedicated in-memory write queue. When a message is deposited in the in-memory write queue (e.g., by the read thread 316 or the monitor thread 312), a condition signal is triggered to wake the write thread 318 to wake out of its "blocking wait" state and to perform a network write of the message detected in the in-memory write queue. After the network write is completed, the write thread 318 returns the memory buffer that contained the message to a free buffer memory pool (i.e., the free memory buffer 418 in FIG. 4) and again posts a "blocking wait" for notification of a new message. While blocked, a thread relinquishes the CPU so that another process in the transaction server can execute.

Figure 4:
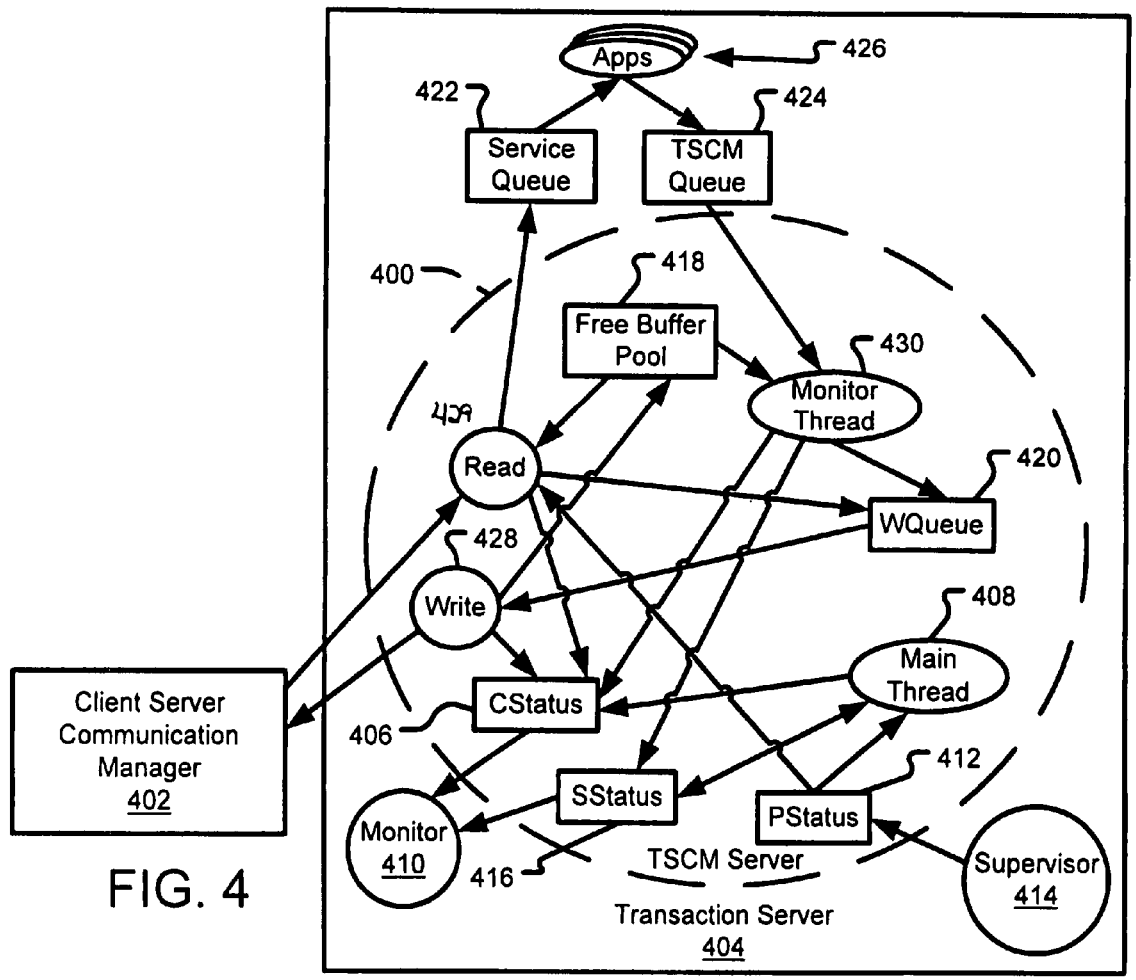
FIG. 4 illustrates a datastores useful in operation of a TSCM server in an embodiment of the present invention.

FIG. 4 illustrates various datastores useful in operation of a TSCM server 400 in an embodiment of the present invention. Each shared datastore is available for access by other processes. When multiple threads or processes access a shared datastore, the multiple accesses are coordinated using a control structure, preferably a mutex. A mutex is used as part of a mutual exclusion scheme enforcing synchronized access by multiple processes to a shared datastore. Only one process can have a mutex lock at a particular time. If a first process tries to lock a mutex that is already locked by a second process, the first process will be blocked until the mutex is unlocked by the second process.

A CSCM 402 executes on a computer platform and communicates across a computer network with a transaction server 404. At initialization, the main thread 408 of the TSCM server 400 executing on the transaction server 404 creates the connect status (CStatus) memory block 406, which is used to store status information on all the network clients (e.g., CSCMs) that are connected to the TSCM server 400. The various threads executing within the TSCM server 400 write the connection status information to the CStatus block 406. A monitor process 410, preferably executing on the transaction server 404, reads the connection status information from the CStatus block 406 to maintain a log, to analyze the information, or to display to a user. In an embodiment of the present invention, the monitor process is a graphical monitor program displaying system information on a client computer (not shown) coupled to the transaction server 404.

Because the read thread 316 and the write thread 318, and referring now to FIG. 3, service the same logical communications connection, the status of the connection must be maintained between the read thread 316 and the write thread 318. The CStatus block 406 includes a detailed data structure for each connection, which preferably includes the overall status of the connection, the IP address and TCP port of the connected client, the socket that represents the client connection, the read and write thread identifiers (e.g., process identifiers or "pids") associated with the connection, the condition signal identifier that is used to wake up the write thread 316, the dedicated mutex identifier used to coordinate access to the connection's write queue, and an address to the write queue of pending service status update messages or service responses to be written across the network.

Both the read thread 316 and the write thread 318 can detect when the associated logical communication connection to the CSCM 308 is no longer valid. For example, the read thread 316 expects to receive acknowledgments from network writes performed by the write thread 318. Failure to receive an anticipated acknowledgment within a predetermined number of retries or a predetermined amount of time indicates that the connection is no longer valid. When this connection is deemed invalid, the detecting thread (i.e., the read thread 316 or the write thread 318) shuts down after notifying its partner thread (i.e., the associated read thread or write thread) that the connection is no longer valid. Accordingly, the partner thread also promptly shuts down. In a real-time environment, the shutdown procedures prepares the TSCM server to accept a new logical communications connection from the same CSCM to re-establish communications and prevents orphaned threads in the TSCM server. An example of an orphaned thread is a write thread executing on a TSCM server when its partner read thread is not active and the associated CSCM is not connected to the TSCM server.

At initialization of the embodiment of the present invention, the main thread 408 of the TSCM server 400 also maps to a process status (PStatus) memory block 412, created and maintained by a supervisor process 414, which records the status of processes running on the transaction server 404 (e.g., all service application other processes). A supervisor process 414 supplies the process status information to the PStatus memory block 412. The PStatus memory block 412 is used to detect when a service application has exited without properly communicating this status to the TSCM server 400. The main thread 408 reads from the PStatus memory block 412 to reconcile an internal datastore of registered service applications (see SStatus memory block 416).

At initialization of the embodiment of the present invention, the main thread 408 of the TSCM server 400 also creates a service status (SStatus) memory block 416, which records the status of service applications running on the transaction server 404. The monitor process 410 reads the connection status information from the SStatus memory block 416 to maintain a log, to analyze the information, or to display to a user. The monitor thread 430 also accesses the SStatus memory block 416 when registering and deregistering service applications. The main thread 408 also accesses the SStatus memory 416 to determine whether a service queue or service application must be created. Various embodiments of the present invention may include zero, one, or more of the foregoing status memory blocks (i.e., CStatus, PStatus, and SStatus) in various combinations. Also, a initialization of an embodiment of the present invention, the main thread 408 preferably creates a free buffer pool 418 for use by threads in the TSCM server 400, as described with regard to FIG. 3.

A service application 426 preferably interacts with the TSCM server 400 via TSCM API services. By utilizing the TSCM API services, the message layout is transparent to the service applications 426 and is maintained by TSCM API calls. The API disclosed herein is an example API used within an embodiment of the present invention. Alternative APIs may also be employed within the scope of the present invention.

A Service Queue 422 is designed to be a multi-reader queue and has the naming convention: TSCM_SERVICE_nn, where nn represents the service number. A service application 426 that has successfully registered with the TSCM server 400 for a given service type will post a blocking read to the service queue 422 for any request messages being received from the CSCM 402 via the TSCM api service tscm_read_from_client. In an embodiment of the present invention, each service queue is sized to hold a maximum of 100 service messages at any one time. The TSCM server 400 opens each service queue as a non-blocking queue to itself. However, the TSCM server 400, via its API services, allows some apps to open with either as blocking or non-blocking.

A TSCM queue 424 stores response messages to be sent to the TSCM server 400 from the service applications 426. The TSCM monitor thread 430 performs a "blocking read" on the TSCM queue 424 for response messages bound for connected CSCMs. The service applications 426 call the TSCM API service: tscm_write_to_client when sending response messages. In one embodiment, the TSCM queue 424 is sized to hold 100 messages. If a service application 426 is unable to successfully write a response message (e.g., due to the queue being full), the TSCM API routine will return an error message to the service application 426.

The TSCM server 400, and its related threads transfer messages amongst themselves, utilizing memory buffers obtained from the free buffer pool block 418 within the transaction server 404. In opposition, a write operation by a write thread 428 is a network data transfer operation between the transaction server 404 and the CSCM 402. The write thread 428 performs the network data transfer of the response message. Network input/output is considerably slower than intra-platform memory operations. This delay is affected by the hardware, traffic, and distance that a message must travel over a network. As a result, the OS and its scheduler are configured to perform a context swap from the write thread 428 to another pending thread during this transmission time.

The use of memory blocks from the free buffer pool 418 permits the response messages to be transferred from the central TSCM queue 424 to the numerous write threads, such as write thread 428, as fast memory-to-memory transfer operations. Once the messages are located within the write queue 420, the write thread 428 may transfer the write messages across the network as a slower rate without hindering the operation of the monitor thread 430. As a result, the operation of a single write thread 428 does not substantially impact the processing of other write messages directed to other CSCMs through their respective write threads.

The monitor thread 430 also monitors the status of the various network connections. If a response is received for Communication Manager 402 when a network connection is not currently active, the monitor thread 430 disposes of the response. The termination of a network connection is coordinated between read thread 429 and write thread 428, with the write thread flushing any outstanding response messages from its work queue and returning the buffer to the free buffer pool 418 before shutting down. As such, the sudden termination of a read and write queue pair will not impact the continuing operation of the TSCM server 400. Preferably, no additional housekeeping is needed to process pending messages when a read and write thread pair are terminated following the disconnection of a CSCM 402 from the TSCM server 400.

One embodiment of a TSCM server 400 has been implemented to run on a UNIX operating system that also supports threads and real-time message queues. POSIX standards have been adhered to in the implementation. The execution environment of the TSCM can be modified by defining the following environment variables:

A TSCM_QPATH environment variable defines the path location of the TSCM queue 424. If the environment variable is not defined, the TSCM queue 424 is created in the default location from which the TSCM server 400 is executing from the path (i.e., "./"). To successfully maintain communication between the TSCM server 400 and the service applications 426, both the TSCM server 400 and the service applications 426 define the TSCM queue path to be the same location. The TSCM server 400 creates the TSCM queue 424 in accordance with the following naming convention: tscm_msgq.

A SERVICE_QPATH environment variable defines the path locations of one or more service queues 422. If the environment variable is not defined, the service queue is created in the default location from which the TSCM is executing (i.e., "./"). To successfully maintain communication between the TSCM server 400 and the service applications 426, both the TSCM server 400 and the service applications 426 define the service queue path to be the same location. The TSCM server 400 creates service queues with the following naming convention: TSCM_SERVICE_nn, where nn represents a service type number.

A TSCM_CFM_PATH environment variable defines the path location of the TSCM configuration datastore (not shown). If the environment variable is not defined, the TSCM server 400 looks for the configuration datastore in the default path from which it is executing. The TSCM server expects to find a configuration datastore with the following naming convention: tscm_tcp.cfg.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A communications manager residing in a communications apparatus for communicating between a remote service request process and one or more service applications providing communications services in a communications network, the communications manager comprising:
   a logical communications connection established between the remote service request process and the communications manager;
   a read thread associated with the logical communications connection receiving a request message communicated by the remote service request process and forwarding the request message to one of the service applications, wherein the remote service request process communicates with a switch to generate the request message, the switch supporting one of the communication services;
   a write thread associated with the logical communications connection receiving a response message generated by the service application and forwarding the response message to the remote service request process; and
   a main thread monitoring a communications port for a connection request associated with the logical communications connection and creating the read thread and the write thread associated with the logical communications connection, responsive to the connection request.

2. The communications manager of claim 1 further comprising:
   a main thread monitoring a communications port for a connection request associated with the logical communications connection and validating the connection request.

3. The communications manager of claim 2 further comprising:
   a configuration datastore storing one or more valid connection identifiers, wherein the main thread validates the connection request against the one or more valid connection identifiers.

4. The communications manager of claim 1 further comprising:
   a response message queue accessibly by all registered service applications; and
   a monitor thread detecting the response message deposited by the service application in the response message queue and directing the response message to the write thread.

5. The communications manager of claim 1 further comprising:
- a write queue accessible by the write thread; and
- a monitor queue receiving the response message from the service application and storing the response message in the write queue for retrieval by the write thread.

6. The communications manager of claim 1 further comprising:
- a service queue associated with a service type receiving the request message from the read thread and storing the request message for retrieval by the service application.

7. The communications manager of claim 1 further comprising:
- a connection status memory block storing information describing active logical communications connections to the communications manager.

8. The communications manager of claim 1, wherein the communications manager resides within a Service Control Point (SCP).

9. A communications manager residing in a communications apparatus for communicating between a remote service request process and one or more service applications providing communications services in a communications network, the communications manager comprising:
- a logical communications connection established between the remote service request process and the communications manager;
- a read thread associated with the logical communications connection receiving a request message communicated by the remote service request process and forwarding the request message to one of the service applications, wherein the remote service request process communicates with a switch to generate the request message, the switch supporting one of the communication services;
- a write thread associated with the logical communications connection receiving a response message generated by the service application and forwarding the response message to the remote service request process; and
- a service status memory block storing information describing active services accessible through the communications manager.

10. A method of communicating between a remote service request process and one or more service applications providing communications services, the method comprising:
- establishing a logical communications connection between the remote service request process and a communications manager;
- creating a read thread associated with the logical communications connection;
- receiving to the read thread a request message communicated by the remote service request process, wherein the remote service request process communicates with a switch to generate the request message, the switch supporting one of the communication services;
- communicating the request message through the read thread to one of the service applications;
- creating a write thread associated with the logical communications connection;
- receiving to the write thread a response message generated by the service application;
- communicating the response message through the write thread to the remote service request process; and
- monitoring, via a main thread, a communications port for a connection request associated with the logical communications connection, wherein the read thread and the write thread associated with the logical communications connection are created in response to the connection request.

11. The method of claim 10 further comprising:
- registering the service application with the communications manager to enable communications between the service request process and the service application.

12. The method of claim 10 wherein the operation of establishing the logical communications connection comprises:
- validating the connection request against a configuration datastore including one or more valid connection identifiers;
- associating the read thread and the write thread with the logical communications connection, if the connection request is successfully validated.

13. The method of claim 10 wherein the operation of communicating a request message comprising:
- monitoring the communications port for receipt of the request message;
- validating the request message;
- verifying that the service application specified in the request message is active; and
- writing the request message to a service queue corresponding to the service application.

14. The method of claim 13 wherein the operation of monitoring a communications port comprises:
- performing a blocking read on a socket associated with the logical communications connection.

15. The method of claim 10 wherein the operation of communicating a response message comprises:
- receiving a condition signal if a response message is received in a write queue associated with the logical communications connection;
- verifying that the logical communications connection is active; and
- writing the response message to the remote service request process responsible for the service request message.

16. The method of claim 15 wherein the operation of receiving a condition signal comprises:
- performing a blocking wait for buffers written to the write queue associated with the logical communications connection.

17. The method of claim 10 wherein the operation of communicating the request message comprises:
- performing a network read operation from the service request process through the logical communications connection.

18. The method of claim 10 wherein the operation of writing the response message comprises:
- performing a network write operation to the service request process through the logical communications connection.

19. The method of claim 10, wherein the communications manager in the establishing step resides within a Service Control Point (SCP).

20. A computer-readable medium having computer-executable instructions for performing the operations recited in claim 10.

21. For use in a telecommunications transaction server, a computer program storage medium readable by a computing system and encoding a computer program for executing a computer process managing communications between a remote service request process and one or more service applications executing within the telecommunications transaction server, the computer program comprising instructions for:

monitoring a communications port for a connection request associated with a logical communications connection;

validating the connection request against a configuration datastore including one or more valid connection identifiers;

associating a read thread and a write thread with the logical communications connection, if the connection request is successfully validated;

registering the service applications with a communications manager to enable communications between the remote service request process and the service application;

creating a read thread associated with the logical communications connection;

receiving the read request message communicated by the remote service request process, wherein the remote service request process communicates with a switch to generate the read request message, the switch supporting one of the communication services;

communicating the request message through the read thread to one of the service applications;

creating a write thread associated with the logical communications connection;

retrieving to the write thread a response message generated by the service application; and communicating the response message through the read thread to the service request process.

22. The computer program storage medium of claim 21 wherein the instructions for communicating the request message comprise instructions for:

performing a network read operation from the remote service request process through the logical communications connection.

23. The computer program storage medium of claim 21 wherein the instructions for communicating the response message comprise instructions for:

performing a network write operation to the remote service request process through the logical communications connection.

24. The computer program storage medium of claim 21, wherein the communications manager in the registering step resides within a Service Control Point (SCP).

25. A communications manager residing in a communications apparatus for message routing in support of telecommunication services, comprising:

a read thread corresponding to a logical communications connection established with a remote service request process, the read thread receiving a request message from the remote service request process and forwarding the request message to a service application, wherein the remote service request process communicates with a switch to generate the request message;

a write thread corresponding to the logical communications connection and receiving a response message generated by the service application and forwarding the response message to the remote service request process; and a main thread monitoring a communications port for a connection request and creating the read thread and the write thread in response to the connection request.

\* \* \* \* \*